April 28, 1970 D. M. WOOD ET AL 3,509,340
X-RAY SCREEN ADAPTER FOR PHOTOGRAPHIC NEGATIVE HOLDER
Filed Jan. 10, 1967 2 Sheets-Sheet 1
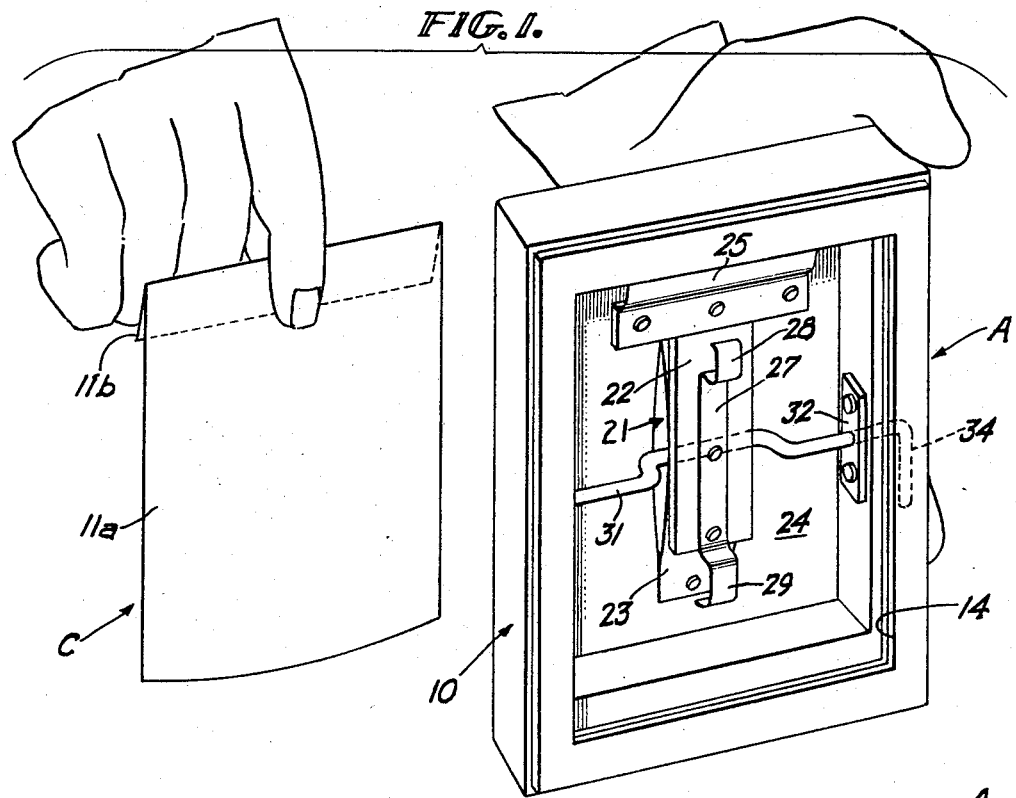
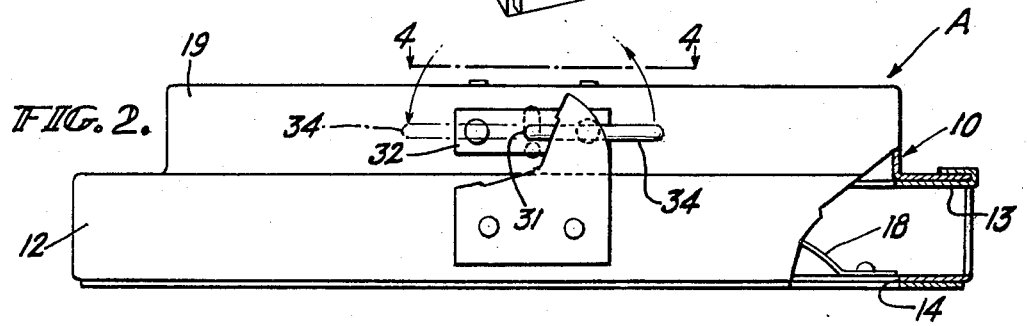
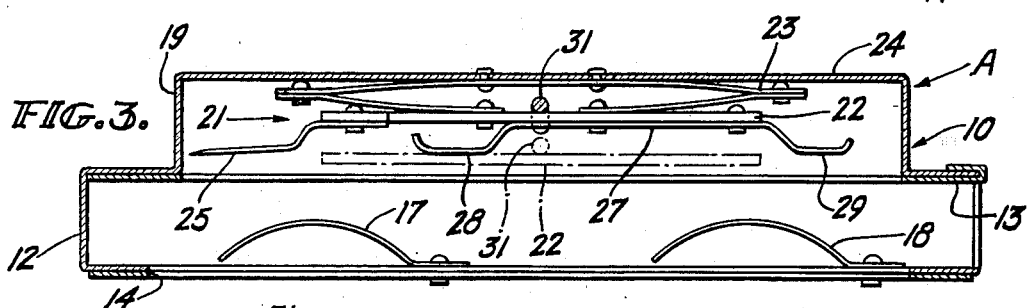
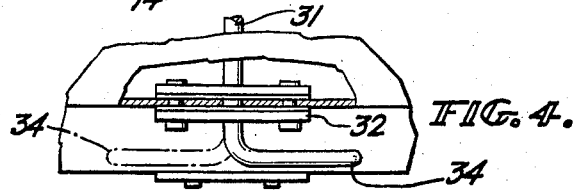
INVENTORS.
DAVIS M. WOOD
WARREN R. VARCOE
BY George C. Sullivan
AGENT

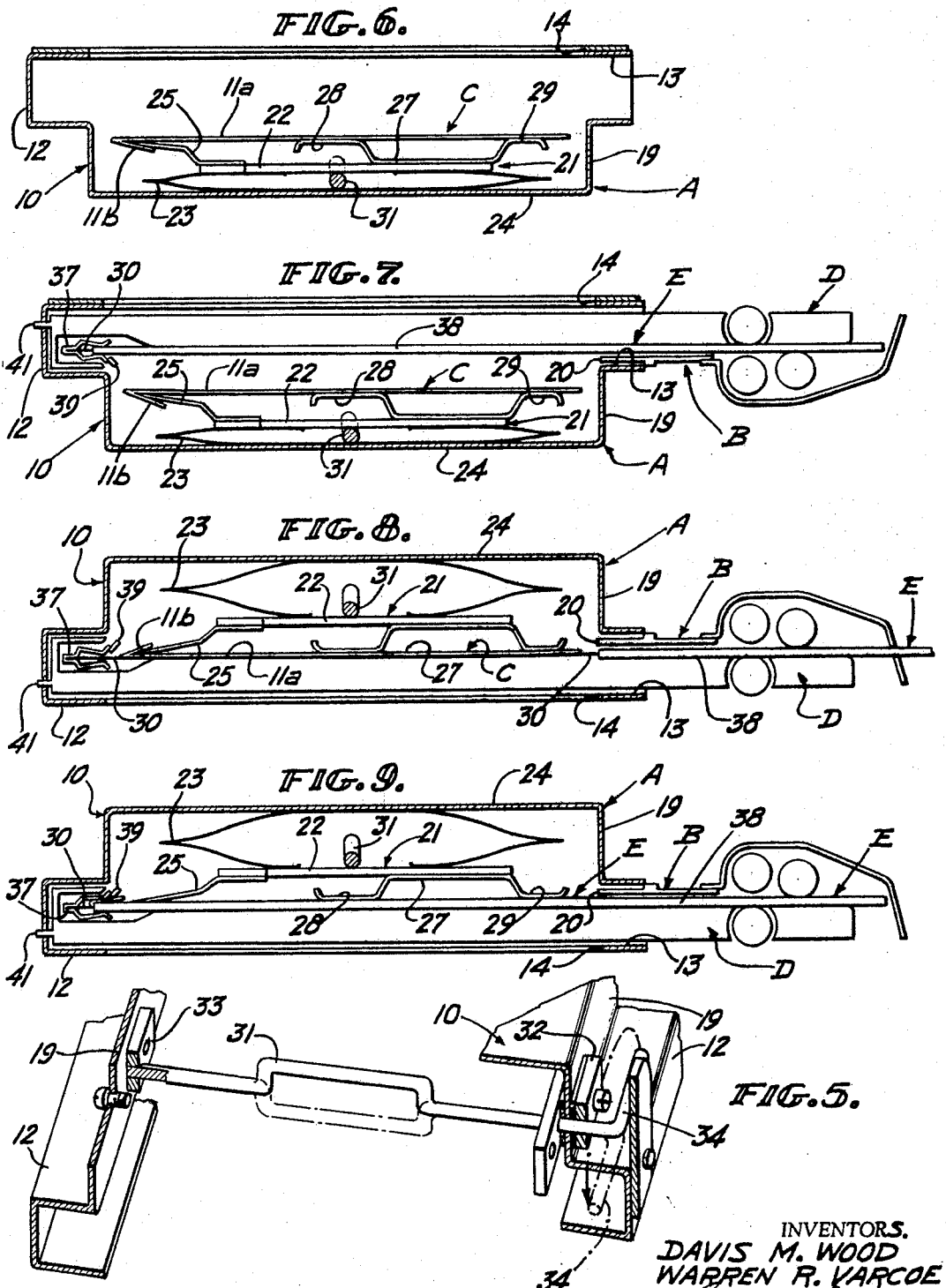

United States Patent Office 3,509,340
Patented Apr. 28, 1970

---

3,509,340
X-RAY SCREEN ADAPTER FOR PHOTOGRAPHIC NEGATIVE HOLDER
Davis M. Wood, Los Altos, and Warren R. Varcoe, Sunnyvale, Calif., assignors to Lockheed Aircraft Corporation, Burbank, Calif.
Filed Jan. 10, 1967, Ser. No. 608,422
Int. Cl. G03b 41/16
U.S. Cl. 250—68                 6 Claims

ABSTRACT OF THE DISCLOSURE

A mechanism, herein referred to an an "adapter," comprising a box-like enclosure with a light-tight recess therein for receiving a Polaroid Land type cassette having inserted therein a Polaroid Land type multilayer photosensitive monopak which includes a photographic negative with a sheet metal sealing clip on one end thereof, the negative being enclosed in a slidably removable envelope. Means are provided in the housing for supporting a sheet of fluoroescent coated material, herein referred to as an "X-ray screen," and for advancing the X-ray screen into face-to-face contact with the negative of a monopak inserted in a casette in the housing upon withdrawing the envelope of the monopak to expose the negative. Upon returning the envelope to its former position the envelope encases the X-ray screen in face-to-face relation with the negative and enters the clip to reseal the monopak. The monopak with the X-ray screen therein can then be removed from the cassette, and after exposure to X-rays the X-ray screen can be removed from the monopak and the latter again resealed by reversing the foregoing procedure, after which the photosensitive elements of the monopak may be developed as desired.

---

This disclosure is not related to any other patent application.

SUMMARY OF THE INVENTION

The invention comprises a housing having a recess therein for receiving in light-tight relation a negative holder, the housing having embodied therein X-ray screen supporting and manipulating means which are operable selectively to urge an X-ray screen supported thereon either toward or away from face-to-face engagement with a negative in the negative holder co-incident with selectively slidably withdrawing and re-inserting a negative-covering element of the negative holder, thereby either to insert the X-ray screen in or to remove it from, the negative holder.

The invention has numerous advantages over the present darkroom-loaded monopacks in rigid cassettes and other negative holders which must be shielded from accidental exposure to random X- or γ-rays, hereinafter referred to as radiation, and which lack the flexibility provided by the present invention.

The invention provides for the daylight loading of an X-ray screen in a photographic negative holder which may be either for conventional cut film, film pack or plate holder, or for a Polaroid Land monopack, and for the subsequent daylight unloading of the X-ray screen prior to developing a radiation exposed negative, thereby avoiding prolonged vulnerability of the negative to random radiation or staining of the X-ray screen by processing chemicals.

The invention also provides for removal of an X-ray screen from a negative holder after exposure to radiation of a negative therein, thereby permitting storage and later development of the exposed negative without concern for damage to the negative by random radiation.

Upon removal of the X-ray screen the exposed negative may be developed at once if desired.

The invention has great utility in field radiography where a flexible monopack with an X-ray screen inserted therein just prior to exposure can be fitted into close quarters, for example, in a complex mechanism wherein the components are in relatively tightly packed relation and where it is desired to make an X-ray check of one or more of the components.

DESCRIPTION

The invention will be apparent from the following description and the accompanying drawings of a preferred embodiment thereof which is constructed for use with a Polaroid Land type cassette and multilayer photosensitive monopack.

In the drawings:

FIGURE 1 is a perspective view showing the adapter together with the X-ray screen removed therefrom.

FIGURE 2 is an enlarged, side edge elevational view of the adapter shown in FIGURE 1, portions being broken away.

FIGURE 3 is a longitudinal sectional view of the adapter shown in FIGURE 1.

FIGURE 4 is a fragmentary elevational view looking in the direction of the arrows 4—4 of FIGURE 2.

FIGURE 5 is a fragmentary perspective view showing the crank mechanism for advancing and retracting the X-ray screen support.

FIGURES 6, 7, 8 and 9 are diagrammatic views in the nature of longitudinal sectional views showing successive steps in the insertion of an X-ray screen in a multilayer photosensitive Polaroid Land type monopack.

Referring to the drawings in detail, in the illustrative form of the invention an adapter A comprises a box-like housing 10 for receiving a negative holder B in light-tight relation therein. An X-ray screen C comprises a sheet portion 11a of suitable material, such as sheet plastic or stiff paper, with a reversely bent end portion 11b thereon. The illustrative adapter A is for use with a negative holder B which is a Polaroid Land type multilayer photosensitive monopack assembly inserted in a Polaroid Land type cassette D. It will be obvious to those familiar with the art that the structure can be readily modified by an ordinary camera technician to operate with a conventional photographic cut film, film pack or plate holder, in which case the slide of the negative holder performs the functions of the monopack envelope as disclosed herein.

The adapter housing 10 is of any suitable material such as, for example, sheet metal or a strong plastic such as Bakelite, and comprises a larger first portion 12 which is open at 13 at one end thereof to receive the portion of a cassette D which is inserted in a camera for taking a picture. An opening 14 is also provided in the lower side of the first portion 12 of the housing for inserting and removing the X-ray screen C.

A pair of arched leaf springs 17 and 18 are provided on each side of the first housing portion 12 adjacent the X-ray screen opening 14 for biasing the cassette D into light-tight engagement with the housing.

A second housing portion 19 is formed integrally and in open communication with the first portion 12, and is of a size, and is so located, as to register with the side opening 20 (FIGURE 7) in the cassette D which faces the camera lens when the cassette is inserted in a camera for taking a picture.

Mounted within this second housing portion 19 is support means 21 for the X-ray screen C, which means is selectively movable toward and away from the open side of the cassette D.

The X-ray screen support means 21 comprises a T-shaped plate 22 mounted on a normally flat or retracted double bow type leaf spring 23 which is attached to the closed side 24 of the second housing portion 19.

The head of the T-shaped plate 22 is directed toward the opposite end of the housing 10 from the cassette opening 13, and a first X-ray screen support member 25 of thin, springy sheet material, such as for example, shim stock, is mounted on, and extends endwise beyond the T-shaped plate 22. The outer end portion of the member 25 is offset laterally from the T-shaped plate 22 as best shown in FIGURE 3.

A second X-ray screen support member 27 comprises a strip of thin, springy material and is secured to the stem of the T-shaped plate 22. Both end portions of this second X-ray screen support member 27 are free for limited resilient movement, are offset from the plate 22, and are provided with flat portions 28 and 29 which define, with the outer end of the support member 25, a plane substantially parallel to the negative 30 (FIGURE 7) of a Polaroid Land type monopack E inserted in a cassette D in the housing 10.

For moving the T-shaped plate 22 and its screen supports 25 and 27 selectively toward and away from the negative 30, a crank 31 is journaled in light-tight bearings 32 and 33 (FIGURES 4 and 5) with a bent end portion 34 thereof located exteriorly of the housing 10 to serve as a crank actuating lever.

The operation of the illustrative form of the invention is diagrammatically illustrated in sequence in FIGURES 6-9 as follows:

With the crank 31 turned to its solid line position of FIGURES 3, 5, 6 and 7 it allows the spring 23 to retract toward its normally flat condition to move the T-shaped plate 22 and the X-ray screen support members 25 and 27 thereon to their retracted position shown in FIGURE 6. The X-ray screen C is placed on the X-ray screen support members 25 and 27 with the reversely bent end portion 11b thereof hooked onto the projecting end portion of the X-ray screen support member 25. As illustrated, this hooked, or reversely bent end portion 11b of the X-ray screen C is integral with the sheet portion 11a thereof, but may, if desired, be of other material, such as, for example, thin metal attached to the sheet portion as by rivets or by adhesive. In any event, this end of the X-ray screen where the reversely bent portion is provided should be sufficiently thin to be capable of being tucked into the metal sealing clip 37 of a monopack E to be used therewith.

With the X-ray screen C thus mounted on its support 21, and with the adapter A positioned with its open side upwardly, the cassette D with a monopack E therein is inserted into the end opening 13 of the housing 10 as shown in FIGURE 7. It will be understood that the monopack E is retained in the cassette D by a usual latch member therein, but since the only elements thereof which are material to the present invention are the envelope 38, the negative 30 and the end sealing clip 37, such other elements are not illustrated or described herein. The monopack E is retained in the cassette D by a usual latch member 39, which is a part of the cassette and which may be released in the usual manner to free the monopack for withdrawal from the cassette by manipulating the usual latch release lever 41 which projects through a hole provided therefor in the end of the housing 10.

With the cassette D and its monopack E in the adapter A as shown in FIGURE 7, the crank actuating lever 34 is swung over 180° to advance the X-ray screen support 21 and the X-ray screen C thereon to their extended position. The envelope 38 is withdrawn to its position in FIGURE 8, thereby bringing the fluorescent coated side of the X-ray screen C into contact with the emulsion side of the negative 30. The adapter A may also be inverted to its position of FIGURE 8 so that gravity will assist the spring 24 in urging the X-ray screen C toward the exposed emulsion side of the negative 30.

The envelope 38 is then reinserted in the casette to its fully seated, light-tight position in the clip 37 as shown in FIGURE 9, enclosing the X-ray screen C in the envelope. During its reinsertion the open end of the envelope engages the angle formed by the reversely bent end portion 11b of the X-ray screen C and carries the screen along with it, tucking the bent end of the screen, together with the open end of the envelope, into the metal clip 37 as shown in FIGURE 9. The monopack E with the X-ray screen C thus inserted and sealed therein can be released from the casette by means of the latch release lever 41 and withdrawn. The monopack is then ready for exposure to radiation for the purpose of making an X-ray picture.

After exposure to radiation the X-ray screen C can be removed from the monopack E by reinserting the latter in the casette D in the adapter A (FIGURE 9), rotating the crank 34 to raise the X-ray screen support 21, withdrawing the envelope 38 (FIGURE 8), inverting the adapter A and swinging the crank control lever 34 to retract the X-ray screen support 21 (FIGURE 7), thereby allowing the free or right hand end of the X-ray screen to gravitate away from the negative 30. Upon re-inserting the envelope with the free end of the X-ray screen thus fallen away from the negative 30, the envelope passes between the X-ray screen and the negative and is advanced until its open end enters the clip 37, leaving the X-ray screen outside the envelope.

The reversely bent end portion of the X-ray screen usually remains tucked into the metal clip 37 upon completion of this removal procedure, so it is advisable to again invert the adapter A to its position of FIGURE 3 for removing the casette E, after which the X-ray screen can be plucked from the clip, ready for future use.

The invention provides a simple, compact, inexpensive and easily operated mechanism for inserting an X-ray screen in, and removing it from, a negative holder. In the form of the invention illustrated and described herein it makes the taking of an X-ray picture with Polaroid-Land type equipment almost as easy as an ordinary photograph.

While we have illustrated and described a preferred embodiment of the present invention, it will be understood, however, that various changes and modifications may be made in the details thereof without departing from the scope of the invention as set forth in the appended claims.

We claim:
1. An adapter for the daylight loading and unloading of an X-ray screen in a negative holder having a light-sealing element slidably movable to uncover and re-cover a negative in the holder upon respectively withdrawing the light-sealing element from, and reinserting it in the holder, said adapter comprising:

a housing having a recess therein for receiving the negative holder in light-tight relation therein, a fluorescent X-ray screen of a size to overlie a selected portion of a negative in the holder, a portion provided on the end of the X-ray screen toward which the light-sealing element moves upon reinsertion thereof for hooked engagement by the light-sealing element and movement of the X-ray screen with the light-sealing element to light-sealed condition in the holder upon such subsequent reinsertion of the light-sealing element, said portion on the end of the X-ray screen comprises a reversely extending flange disposed in the path of movement of the light-sealing element during such subsequent reinsertion thereof, an X-ray screen support movably mounted in the housing for supporting the X-ray screen opposite to, and facing a negative in the holder, and actuating means for moving the X-ray screen supported on the screen support between a retracted position spaced from a negative in the holder, with the light-sealing element withdrawn to uncover the negative, and an advanced position with the X-ray screen in face-to-face juxtaposition with the uncovered negative, whereby, upon subsequent reinsertion of the light-sealing element, the X-ray screen is enclosed, together with the negative, in the holder.

2. An adapter as claimed in claim 1 wherein the housing has an opening in one side thereof of a size to admit the X-ray screen for mounting the screen on its support, and the side of the housing opposite this opening is closed, and is spaced from the negative holder when the latter is in the housing recess.

3. An adapter as claimed in claim 1 wherein the X-ray screen support comprises a movable plate and a plurality of spring elements mounted thereon, facing a holder in the housing recess and defining a surface for supporting the X-ray screen thereon.

4. An adapter for the daylight loading and unloading of an X-ray screen in a Polaroid Land type multilayer photosensitive monopack loaded in, and facing the open side of a cassette having an open side and a closed side, the monopack comprising a photosensitive negative, a light-sealing envelope slidably movable to uncover and recover the negative upon respectively withdrawing the envelope from, and reinserting it in the cassette, and a sealing clip for sealing the envelope upon its reinsertion in the cassette, said adapter comprising:

- a housing having a reces therein for receiving the cassette, loaded with a monopack, in light-tight relation therein, the housing having a closed side opposite to and spaced from a monopack loaded in the open side of a cassette in the housing recess,
- a fluorescent X-ray screen of a size to overlie a selected portion of the negative in a monopack loaded in a cassette in the housing recess,
- an X-ray screen support movably mounted in the housing in the space between a monopack loaded in a cassette in the housing recess and the closed side of the housing,
- said X-ray screen support comprising a plate mounted on a spring attached to the closed side of the housing, and a plurality of light spring elements are mounted on the side of the plate facing the negative, portions of the spring elements defining a surface for supporting the X-ray screen,
- means releasably mounting the X-ray screen on the X-ray screen support with the screen facing a monopack loaded in a cassette in the housing recess, and
- actuating means for moving an X-ray screen mounted on the screen support between a retracted position spaced from a monopack loaded in a cassette in the housing recess, with the envelope of the monopack withdrawn to uncover the negative, and an advanced position in face-to-face juxtaposition with the negative of the monopack, whereby, upon reinsertion of the envelope in the cassette with the X-ray screen in its advanced position the X-ray screen is enclosed, together with the negative, in the envelope.

5. An adapter as claimed in claim 4 wherein the actuating means comprises a crank, journaled in the housing and acting on the X-ray screen support.

6. An adapter as claimed in claim 5 wherein the crank is journaled in light-tight bearings and one end thereof projects beyond the housing, and a lever is provided on the projecting end of the crank for operating the crank.

References Cited

UNITED STATES PATENTS 3,174,039   3/1965   Frede et al. _____ 250—68

RALPH G. NILSON, Primary Examiner

A. L. BIRCH, Assistant Examiner

U.S. Cl. X.R.

250—66, 80